United States Patent [19]
Ulbrich

[11] 3,837,032
[45] Sept. 24, 1974

[54] APPARATUS FOR CLEANING WINDSHIELDS OR THE LIKE

[75] Inventor: Gerhard Ulbrich, Buhl, Germany

[73] Assignee: Robert Bosch GmbH, Stuttgart, Germany

[22] Filed: Oct. 13, 1972

[21] Appl. No.: 297,374

[30] Foreign Application Priority Data
Oct. 23, 1971  Germany............................ 2152978

[52] U.S. Cl......... 15/250.17, 15/250.23, 15/250.29, 310/13, 318/687
[51] Int. Cl.............................. B60s 1/16, B60s 1/34
[58] Field of Search....... 15/250.24, 250.25, 250.27, 15/250.16, 250.17, 250.29; 310/12, 13, 14, 23; 318/687

[56] References Cited
UNITED STATES PATENTS

| | | | |
|---|---|---|---|
| 1,570,842 | 1/1926 | Kevari.................................... | 310/23 |
| 1,668,278 | 5/1928 | Langdon................................ | 310/23 |
| 1,881,015 | 10/1932 | Ayers................................... | 310/13 X |
| 2,337,430 | 12/1943 | Trombetta............................ | 310/13 |
| 2,893,041 | 7/1959 | Schafer................................. | 310/12 X |
| 2,984,855 | 5/1961 | Murray................................. | 15/250.29 |
| 3,070,733 | 12/1962 | Ziegler.................................. | 310/13 X |
| 3,162,796 | 12/1964 | Schreiber et al................. | 318/687 X |

*Primary Examiner*—Peter Feldman
*Attorney, Agent, or Firm*—Michael S. Striker

[57] ABSTRACT

A windshield wiping apparatus wherein the arm for the wiper blade is mounted directly on the armature of a linear electric motor. The inductor of the motor serves as a guide for the armature, and its curvature conforms to that of the lower edge portion of the windshield. The armature can be held in the parking position of the wiper blade by a locking lever which is disengaged from the armature by an electromagnet in response to closing of a master switch which is operated by the driver to start the motor. The armature automatically returns the wiper blade to parking position when the master switch is opened.

7 Claims, 3 Drawing Figures

PATENTED SEP 24 1974  3,837,032

APPARATUS FOR CLEANING WINDSHIELDS OR THE LIKE

The present invention relates to apparatus for cleaning panes of glass, plastic or the like, and more particularly to improvements in apparatus for cleaning the windshields or rear windows of automotive vehicles. Still more particularly, the invention relates to improvements in drive means for moving one or more wiper blades along the outer side of a windshield or rear window in an automotive vehicle.

In presently known apparatus which are used for cleaning of transparent or translucent panes on automotive vehicles, the arm or arms for wiper blades are driven by an electric motor having a rotary output shaft. The transmission between the wiper arm or arms and the output shaft employs cables, belts, feed screws or flexible shafts each of which contributes to the complexity and cost of the drive means and does not allow for rapid movements of wiper blade or blades along the outer side of the pane. In many instances, especially when the vehicle is driven in a rainstorm, the speed of wiper blades does not suffice to guarantee satisfactory visibility. Still further, the space which is available in many automotive vehicles is such that the bearings for moving parts cannot be mounted in an optimum position so that the operation of the apparatus is accompanied by excessive noise and results in excessive wear due to pronounced friction.

SUMMARY OF THE INVENTION

An object of the invention is to provide novel and improved drive means for use in windshield wiping and analogous apparatus which is capable of moving one or more wiper blades at a relatively high speed and is simpler, more compact, more rugged and quieter than heretofore known drive means.

Another object of the invention is to provide a novel and improved prime mover for use in the drive means for wiper blades in apparatus for the cleaning of windshields or the like.

A further object of the invention is to provide a novel and improved cleaning apparatus which embodies the above outlined drive means, whose operation can be regulated in a simple and efficient way, and which is still effective under circumstances when a conventional cleaning apparatus cannot do the job.

The invention resides in the provision of an apparatus for the cleaning of transparent or translucent panes, especially for wiping windshields or rear windows of automotive vehicles, which comprises a linear electric motor having elongated inductor means extending along the pane to be cleaned (e.g., along the lower edge of a windshield) and armature means mounted for reciprocatory movement lengthwise of the inductor means, and pane-engaging wiper means mounted on and movable with the armature means. If the pane to be cleaned is curved, the curvature of the inductor means at least substantially corresponds to the curvature of an edge portion of the pane.

The armature means can be mounted for movement to and from a parking position at one lateral side of the pane, and the apparatus preferably further comprises locking means for automatically holding the armature means in the parking position in response to opening of the electric control circuit for the armature means. The arrangement is such that, when the driver of the vehicle opens a master switch in the control circuit, the armature means continues to move until it reaches the parking position.

The novel features which are considered as characteristic of the invention are set forth in particular in the appended claims. The improved cleaning apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
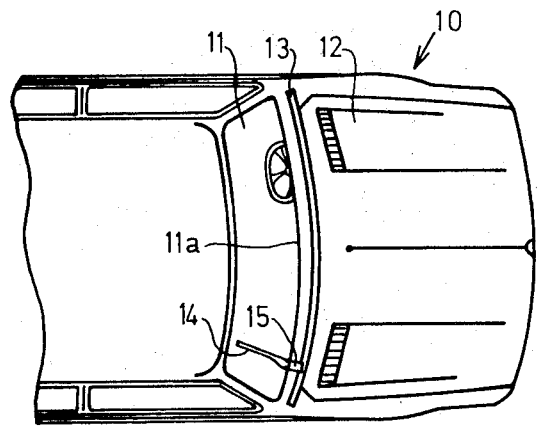
FIG. 1 is a fragmentary plan view of an automotive vehicle which embodies the improved cleaning apparatus and wherein the cleaning apparatus is used to wipe the windshield.

Referring first to FIG. 1, there is shown the front part of an automotive vehicle 10 having a curved windshield 11 and a hood 12 which is provided with an arcuate slot 13 extending along the arcuate lower edge portion 11a of the windshield 11. The prime mover 16 of the drive means for a wiper arm 15 is installed in the space below the hood 12. The wiper arm 15 extends upwardly through the slot 13 and carries a customary wiper blade 14 which can sweep along the front side of the windshield 13 by moving sideways back and forth between the lateral edges of the windshield. Suitable resilient means (not shown) are provided to bias the wiper arm 14 against the outer side of the windshield 11.

Figure 2:
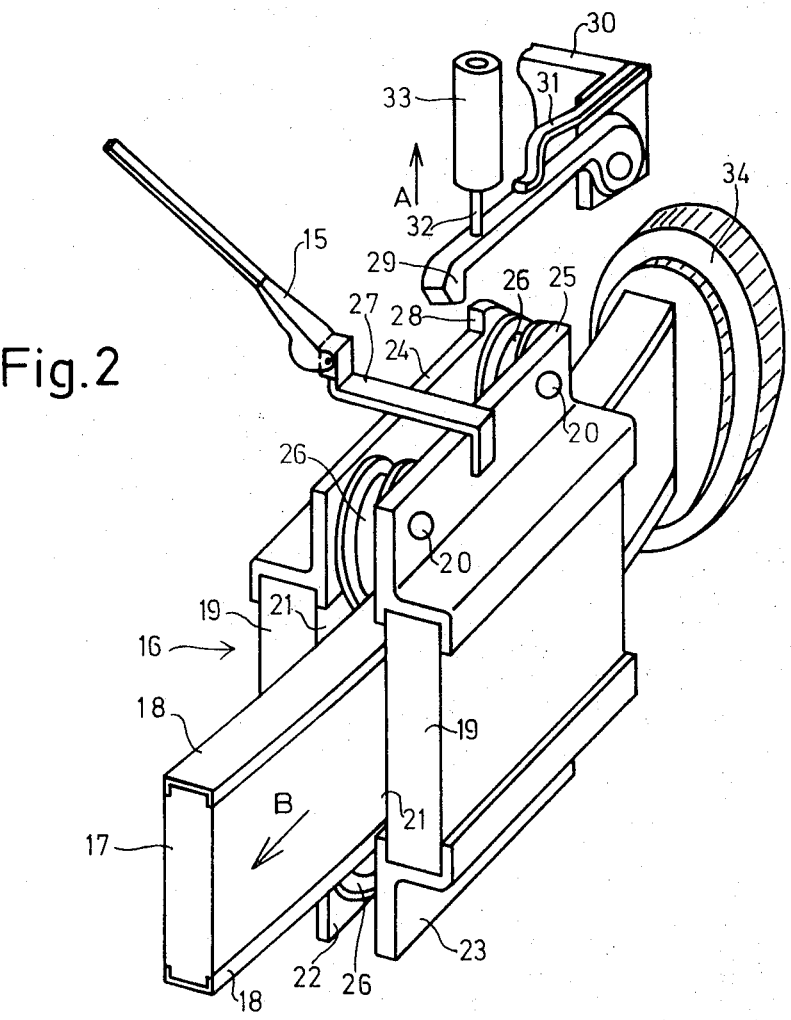
FIG. 2 is an enlarged fragmentary perspective view of the cleaning apparatus.

In accordance with a feature of the invention, the prime mover 16 is a linear electric motor (see FIG. 2) whose inductor 17 forms part of means for guiding a reciprocable armature 19–27 including two packages of plates 19. A linear motor which can be used in the apparatus of the present invention is disclosed in U.S. Pat. No. 3,531,666. The inductor 17 is curved so that its curvature conforms to or closely approximates that of the lower edge portion 11a of the windshield 11. As shown in FIG. 2, the inductor 17 has a rectangular cross-sectional outline and includes two substantially horizontal narrow sides and two substantially vertical wide sides. Thus, one of the narrow sides of the inductor 17 is located at a level above the other narrow side. The two narrow sides of the inductor 17 are overlapped by U-shaped guide rails 18 which serve as reinforcing means to enhance the stability and rigidity of the inductor.

The armature of the linear motor 16 comprises the aforementioned packages of plates 19 which are connected to each other by distancing bolts 20 so that each package defines with the adjacent wider side of the inductor 17 a relatively narrow air gap 21. The distancing bolts 20 are secured to holders 22, 23, 24 and 25. The holders 22, 23 extend downwardly beyond the lower guide rail 18 and the holders 24, 25 extend upwardly above the upper guide rail 18. It will be noted that each holder comprises a U-shaped portion which receives the adjacent part of the respective package of plates 19. Each distancing bolt 20 constitutes the shaft of a roller follower or wheel 26 which is mounted between the respective holders 22, 23 or 24, 25 and tracks the exposed horizontal surface of the adjacent guide rail 18. Such mounting of the armature on the reinforcing rails 18 for the inductor 17 insures an accurate guidance of the wiper arm 15 which is installed on a laterally extending rail 27 secured to the upwardly extending plate-like portion of the holder 25. The wiper arm 15 is pivotable on the free end of the rail 27 and extends outwardly through the slot 13 in the hood 12.

Figure 3:
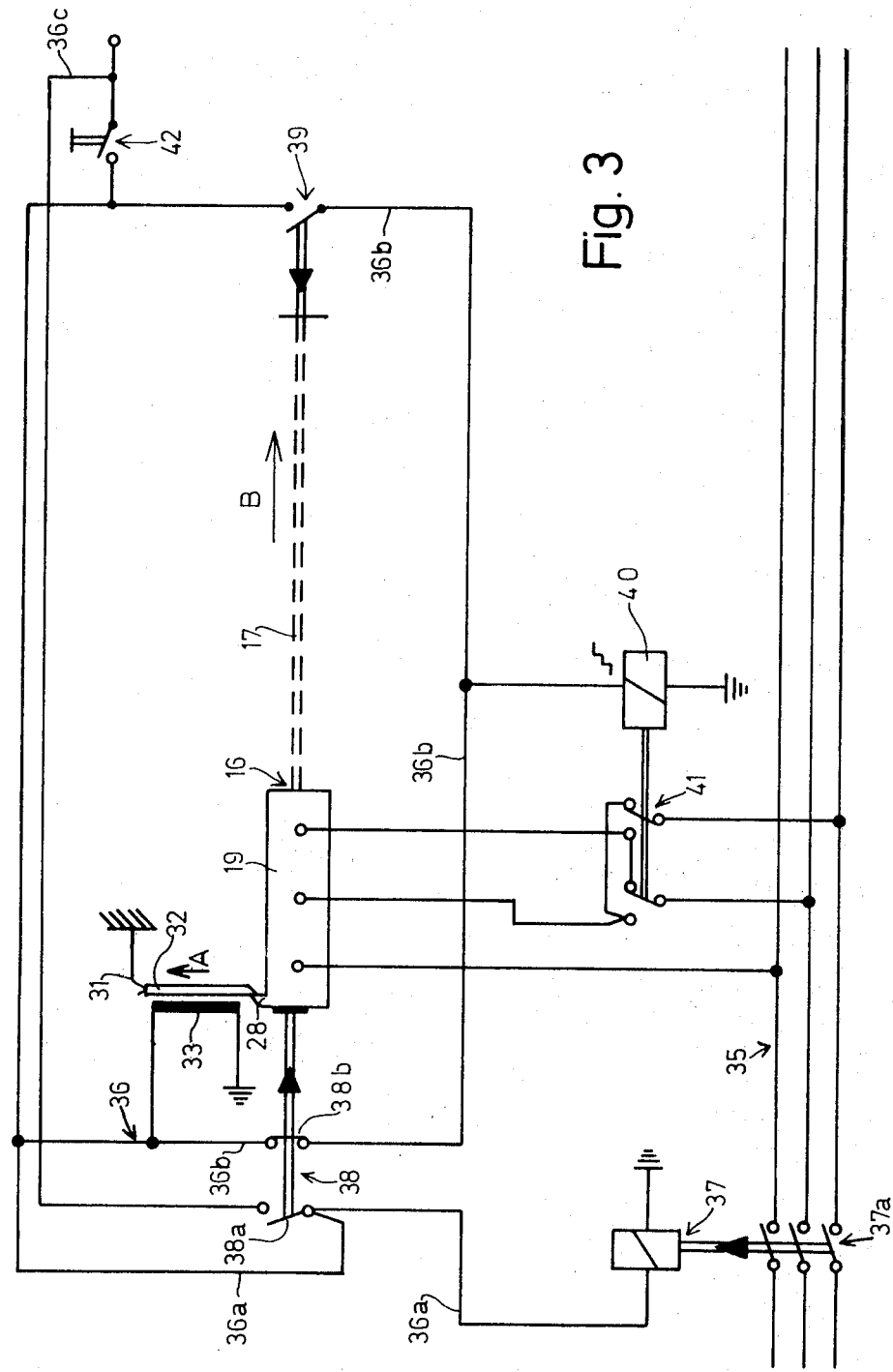
FIG. 3 is a diagram of the cleaning apparatus, showing the electric control circuit for the armature means of the linear motor.

The armature 19-27 of the linear motor 16 is movable between two end positions one of which constitutes a parking position (see the position of the plates 19 in FIG. 3). The apparatus further comprises locking means for holding the armature and the wiper blade 14 in the parking position when the apparatus is not in use. The locking means comprises a projection or tooth 28 provided at one end of the holder 24 and a one-armed locking lever 29 which is mounted on a bracket or traverse 30 installed in the frame of the vehicle below the hood 12. The locking lever 29 is pivotable between an operative position in which it can engage and hold the projection 28 on the holder 24 and a raised or inoperative position. The means for permanently biasing the lever 29 to the operative position comprises a leaf spring 31 which is mounted on the bracket 30. The means for withdrawing the pallet of the lever 29 from the path of movement of the projection 28 comprises an electromagnet 33 having a rod-like armature 32 which is articulately connected with the lever 29. When the electromagnet 33 is energized, the rod 32 moves upwardly and lifts the pallet of the locking lever 29 against the opposition of the leaf spring 31 so that the pallet is disengaged from the projection 28 on the holder 24 and the entire armature of the linear motor 16 is free to move lengthwise of the inductor 17. The electromagnet 33 comprises a tubular winding which surrounds the upper part of the rod 32. The parking position of the armature is preferably that end position in which the wiper arm 14 is adjacent to the left-hand lateral edge portion of the windshield 11 (i.e., the arm 14 is then adjacent to the driver of the vehicle 10).

The means for mounting the end portions of the inductor 17 in the frame of the vehicle 10 below the hood 12 preferably comprises elastic damping or cushioning elements 34 one of which is shown in FIG. 2. The cushioning elements 34 not only serve as part of the means for connecting the inductor 17 to the frame of the vehicle 10 but also as yieldable abutments or stops for the armature in the respective end positions of the wiper blade 14. The purpose of the cushioning elements 34 is to reduce the likelihood of damage to the moving parts and to insure that the operation of the cleaning apparatus is practically noiseless.

The electric control circuit 36 for the armature 19-27 of the linear motor 16 can be connected with a source 35 of polyphase current (see FIG. 3) in response to energization of a master relay 37. The control circuit 36 includes two limit switches 38, 39 which are located in the path of movement of the armature and are actuated when the wiper blade 14 reaches the respective end positions. The limit switches 38, 39 are connected with a reversing relay 40 which controls a reversing switch 41. The limit switch 38 comprises movable contacts 38a, 38b one of which is closed when the other is open, and vice versa. The aforementioned electromagnet 33 is connected in the control circuit 36, and the latter further includes a normally open master switch or starter switch 42 which can be mounted on the dashboard to be closed by the driver of the vehicle 10.

The operation is as follows:

FIG. 3 illustrates the master switch 42 in the open position; therefore, the armature 19-27 of the linear motor 16 dwells in the parking position and the wiper blade 14 is located close to that lateral portion of the windshield 11 which is adjacent to the driver's seat. The limit switch 39 is open because the armature of the motor 16 is located at the other end of the inductor 17. The contact 38a of the limit switch 38 is open and the contact 38b is closed.

The electromagnet 33 is deenergized because the master switch 42 is open. Consequently, the rod 32 allows the leaf spring 31 to urge the locking lever 29 to the operative position in which the pallet at the free end of the lever 29 engages and holds the projection 28 on the holder 24 of the armature of the motor 16. The armature of the motor 16 is disconnected from the current source 35 because the master relay 37 is deenergized.

If the driver wishes to set the apparatus in motion, the master switch 42 is closed whereby a current flows through the conductor 36a and the master relay 37 is energized to close its switch 37a and to connect the plates 19 with the current source 35. The electromagnet 33 is energized on closing of the master switch 42 by current flowing in the conductor 36b so that the rod 32 rises and pivots the locking lever 29 against the opposition of the leaf spring 31 (see the arrow A in FIGS. 2 and 3) with the result that the armature of the motor 16 is released for movement away from the limit switch 38 and toward the limit switch 39. Also, and since the contact 38b of the limit switch 38 is still closed, the relay 40 is energized by way of the conductor 36b to change the position of the reversing switch 41 so that the armature of the motor 16 begins to move in the direction indicated by the arrow B. The armature is guided by the inductor 17 and reinforcing rails 18 in a manner as shown in FIG. 2.

As soon as the armature of the motor 16 leaves the parking position of FIG. 3, the limit switch 38 automatically closes its contact 38a and opens the contact 38b. Such change in the positions of contacts 38a, 38b does not influence the operation of the motor 16, i.e., the armature of the motor continues to move toward the limit switch 39. When the limit switch 39 is closed, the relay 40 is energized by current flowing in the conductor 36b so that the position of the reversing switch 41 is changed and the motor 16 drives its armature back toward the position shown in FIG. 3. The limit switch 39 opens as soon as the armature leaves the right-hand end position of FIG. 3 and the armature moves the wiper blade 14 along the outer side of the windshield 11 back toward the parking position in which the armature actuates the limit switch 38 so that the contact 38a opens and the contact 38b closes. The relay 40 is energized again and causes the reversing switch 41 to change the direction of movement of the wiper blade 14. The same procedure is repeated again and again as long as the master switch 42 remains in the closed position.

If the driver wishes to return the wiper blade 14 to the parking position, the master switch 42 is caused to open. Since the contact 38a of the limit switch 38 is closed in each but the parking position of the wiper blade 14, the opening of master switch 42 does not result in immediate stoppage of the motor 16. Thus, a holding current for the master relay 37 flows through a conductor 36c and contact 38a. The conductor 36a continues to supply current for the electromagnet 33 and relay 40. Consequently, the armature of the motor 16 continues to move except if the master switch 42 is opened at the exact moment when the plates 19 dwell in the positions shown in FIG. 3. As the armature of the motor 16 continues to move after opening of the master switch 42, it ultimately returns to the parking position and opens the contact 38a. The flow of current is interrupted and the switch 37a of the master relay 37 opens to disconnect the armature of the motor 16 from the current source 35. At the same time, the electromagnet 33 is deenergized so that the spring 31 is free to pivot the locking lever 29 to the operative position in which the pallet of the lever 29 moves into the path of the projection 28 and prevents the armature of the motor 16 from leaving the parking position.

An important advantage of the improved apparatus is that the wiper arm 15 can be mounted directly on the armature of the linear motor 16 so that the apparatus can operate properly without the use of complex bearings. Furthermore, the wiper arm 15 can be guided in a very simple and reliable way because it is mounted on the armature which in turn is guided directly by the inductor 17 and rails 18. The curvature of the inductor 17 depends on the nature of the windshield 11, i.e., the upper and lower sides of the inductor 17 can be located in parallel planes. The curvature of the inductor 17 is more complex if the automotive vehicle has a panoramic windshield.

The mounting of the inductor 17 on the cushioning elements 34 insures that the operation is practically noiseless and such mounting renders it possible to move the wiper blade 14 back and forth at a relatively high speed so that the wiping or cleaning action is satisfactory even under the most adverse circumstances.

The armature of the motor 16 can carry several discrete wiper arms.

The mode of operation of a linear motor is known and thus requires no detailed description.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for cleaning a transparent pane having an elongated curved edge portion especially for wiping windshields or rear windows in automotive vehicles, comprising a linear electric motor having elongated inductor means extending along the pane to be cleaned and having a curvature at least substantially corresponding to the curvature of said edge portion; armature means mounted for reciprocatory movement lengthwise of said inductor means; and pane-engaging wiper means mounted on and movable with said armature means.

2. Apparatus for cleaning transparent panes especially for wiping windshields or rear windows in automotive vehicles, comprising a linear electric motor having elongated inductor means extending along the pane to be cleaned and armature means mounted for reciprocatory movement lengthwise of said inductor means, said armature means being movable to and from a parking position and including a circuit; locking means arranged to automatically hold said armature means in said parking position in response to opening of said circuit of said armature means, said locking means comprising a locking member adjacent to the path of movement of said armature means and movable to and from an operative position in which said locking member engages and holds a portion of said armature means when the latter reaches said parking position; a control circuit for said armature means including normally open master switch means for completing said circuit, said circuit including electromagnet means arranged to maintain said locking member out of said operative position when said circuit is completed in response to closing of said master switch means; and pane-engaging wiper means mounted on and movable with said armature means.

3. Apparatus for cleaning transparent panes especially for wiping windshields or rear windows in automotive vehicles, comprising a linear electric motor having elongated inductor means extending along the pane to be cleaned, said inductor means comprising two end portions; armature means mounted for reciprocatory movement lengthwise of said inductor means; pane-engaging wiper means mounted on and movable with said armature means; electric control circuit for said armature means associated with said inductor means, said circuit including means for reversing the direction of movement of said armature means in the region of each end portion of said inductor means; and cushioning means provided in the path of movement of said armature means in each of said regions.

4. Apparatus as defined in claim 1 wherein said inductor means comprises a plurality of longitudinally extending sides and further comprising reinforcing means for at least one of said sides.

5. Apparatus as defined in claim 4, wherein said reinforcing means comprises a rail and said armature means comprises follower means arranged to track said rail.

6. Apparatus as defined in claim 3, wherein said cushioning means constitutes means for connecting said end portions of said inductor means to the frame of an automotive vehicle.

7. Apparatus as defined in claim 1, further comprising an electric control circuit for said armature means and master switch means actuatable to complete said circuit, said circuit including a source of polyphase current.

* * * * *